US006366338B1

(12) United States Patent
Masubuchi et al.

(10) Patent No.: US 6,366,338 B1
(45) Date of Patent: Apr. 2, 2002

(54) LINE-SCANNING OPTICAL PRINTER

(75) Inventors: Sadao Masubuchi; Shigeru Futakami; Masaaki Matsunaga; Masafumi Yokoyama; Akira Shiota, all of Tokorozawa; Maki Wakita, Tanashi; Kazunari Takahashi, Tanashi; Shinichi Nonaka, Tanashi; Chikara Aizawa, Tanashi, all of (JP)

(73) Assignee: Citizen Watch Co. Ltd., Tokyo (JP)

(*) Notice: Subject to any disclaimer, the term of this patent is extended or adjusted under 35 U.S.C. 154(b) by 0 days.

(21) Appl. No.: 09/367,889

(22) PCT Filed: Dec. 22, 1998

(86) PCT No.: PCT/JP98/05825

§ 371 Date: Jan. 11, 2000

§ 102(e) Date: Jan. 11, 2000

(87) PCT Pub. No.: WO99/32299

PCT Pub. Date: Jul. 1, 1999

(30) Foreign Application Priority Data

| | | |
|---|---|---|
| Dec. 22, 1997 | (JP) | 9-352869 |
| Dec. 25, 1997 | (JP) | 10-002822 |
| Dec. 25, 1997 | (JP) | 9-356629 |
| Jan. 12, 1998 | (JP) | 10-004044 |
| Jan. 19, 1998 | (JP) | 10-007477 |

(51) Int. Cl.[7] ........................ G03B 27/54; G03B 27/44; G03B 27/72

(52) U.S. Cl. .............................. 355/67; 355/41; 355/71

(58) Field of Search .............................. 355/41, 27, 28, 355/29, 40, 18, 37, 45, 67, 71, 407; 358/474, 505, 509, 510, 513, 475, 482, 501; 399/211; 250/334; 347/239, 225, 238; 349/1

(56) References Cited

U.S. PATENT DOCUMENTS

| | | | | | |
|---|---|---|---|---|---|
| 4,016,578 A | * | 4/1977 | Friedman | 354/86 |
| 4,317,137 A | * | 2/1982 | Tompkins | 358/286 |
| 4,378,149 A | * | 3/1983 | Ebner | 354/5 |
| 4,547,787 A | * | 10/1985 | Kaneko et al. | 346/160 |
| 4,589,732 A | * | 5/1986 | Shiraishi et al. | 350/331 R |
| 4,651,176 A | | 3/1987 | Yamakawa et al. | 347/130 |
| 4,937,676 A | * | 6/1990 | Finelli et al. | 358/229 |
| 4,975,729 A | * | 12/1990 | Gordon | 355/1 |
| 5,032,911 A | * | 7/1991 | Takimoto | 358/501 |
| 5,864,390 A | * | 1/1999 | Johnson et al. | 355/67 |
| 5,912,458 A | * | 6/1999 | Squires et al. | 250/234 |
| 5,923,042 A | * | 7/1999 | Mietta et al. | 250/559.06 |
| 5,959,654 A | * | 9/1999 | Yoshida | 347/238 |
| 6,014,202 A | * | 1/2000 | Chapnik et al. | 355/67 |
| 6,016,157 A | * | 1/2000 | Stephenson | 347/239 |
| 6,020,948 A | * | 2/2000 | Tumidei | 355/27 |

FOREIGN PATENT DOCUMENTS

| | | |
|---|---|---|
| JP | A58218053 | 11/1983 |
| JP | A07012028 | 1/1995 |

OTHER PUBLICATIONS

European Search Report, dated Mar. 13, 2001 for EP Application No. 98961491.

* cited by examiner

*Primary Examiner*—Russell Adams
*Assistant Examiner*—Rodney Fuller
(74) *Attorney, Agent, or Firm*—Smith, Gambrell & Russell

(57) ABSTRACT

A line-scanning optical printer, which forms an image on a sensitized sheet (25) by projecting a linear light having a given width and length thereto while successively scanning individual lines in the direction of the width, comprises a casing (50) having light shielding properties and including a window portion for radiating the linear light to the outside, a light emitting element (60), which substantially functions as a point light source and is stored in the casing, an optical system (72, 71, 73) for guiding light from the light emitting element (60) as the linear light to the window portion, and a liquid crystal optical shutter (80) attached to the window portion.

39 Claims, 14 Drawing Sheets

Fig.6A
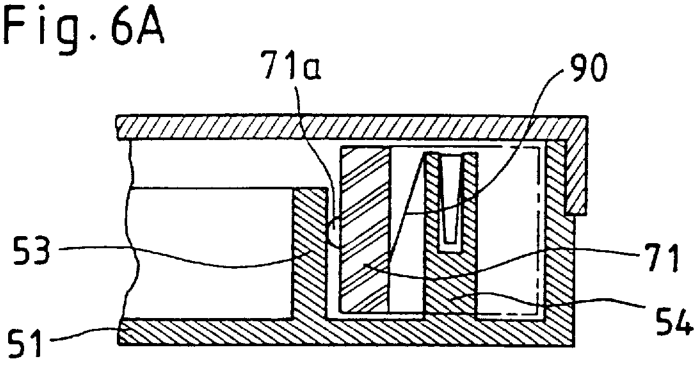
Fig.6B
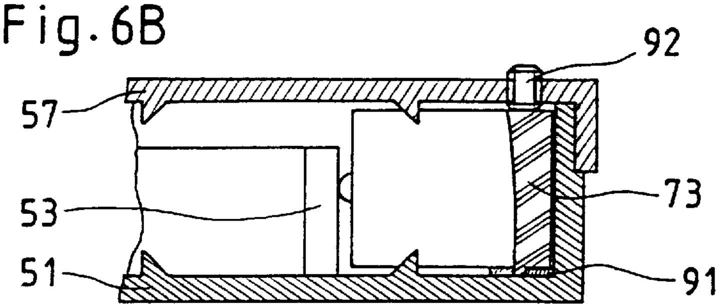
Fig.7B
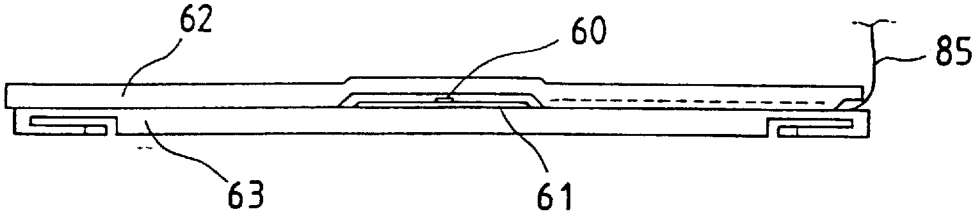
Fig.7A
Fig.7C
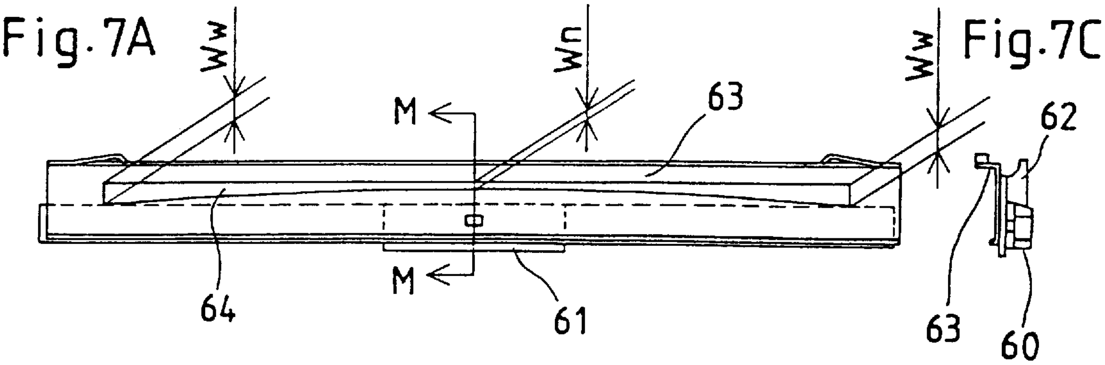

96
H
97
96a 94
96
96c
96b
96c
96b
96c
97
96b

PRIOR ART

LINE-SCANNING OPTICAL PRINTER

TECHNICAL FIELD

The present invention relates to a line-scanning optical printer, in which sensitized paper is scanned by means of a scanning head so that the sensitized paper is exposed to a linear light with a given width and length projected from the scanning head, whereby an image is formed.

BACKGROUND ART

Video printers are spread as a type of line-scanning optical printers, whereby a digitally processed image on a display is printed on a sensitized sheet. The video printers may be based on any of print systems including a thermal system, ink jet system, laser beam scanning system, liquid crystal shutter system, etc. Among these systems, the liquid crystal shutter system is watched as the best suited one for a small-sized, lightweight printer. An example of a video printer of the liquid crystal shutter type is disclosed in Japanese Patent Application Laid-open No. 2-287527.

The disclosed video printer will now be described with reference to FIG. 21.

A casing 101 contains therein a film loading portion 102 for holding a film pack FP that is stored with a large number of self-processing films F. Further, conveyor roller means 106 is located adjacent to an aperture 103 of this film loading portion 102. The conveyor roller 106 is composed of a pair of rim drive rollers 104*a* and 104*b*, which holds therebetween and draw out a specified film F from the film pack FP in the film loading portion 102, and a pair of squeezing rollers 105*a* and 105*b* for developing the film F after exposure for recording.

An exposure recording portion 107 for forming an image on the film F is located between the rim drive roller pair 104*a* and 104*b* and the squeezing roller pair 105*a* and 105*b*. The exposure recording portion 107 includes a light source 108 such as a halogen lamp. The film F is exposed to light emitted from the light source 108 and transmitted through an optical fiber bundle 109, a color filter (not shown) having three colors, R, G and B, which are arranged parallel to one another in an image sub-scanning direction, a liquid crystal light bulb 110, and a refractive index distribution lens array 111.

Polarization plates are arranged individually on the upper and lower surface portions of the liquid crystal light bulb 110, having their deflecting directions in parallel relation. On the other hand, a first glass substrate is located inside the polarization plates. The color filter (not shown), having thin films of three colors, R, G and B, deposited thereon by vacuum evaporation, is formed on one surface portion of the first glass substrate, while a plurality of pixel electrodes, in which transparent electrodes are linearly arranged along the color filter (not shown), that is, in the sub-scanning direction, are formed on the other surface portion.

A liquid crystal, such as a twisted nematic liquid crystal, is sealed between the pixel electrodes and a second glass substrate. In this case, a common electrode, a transparent electrode, is formed on the second glass substrate side of a boundary surface between the second glass substrate and the liquid crystal by vacuum evaporation. The polarization plates are arranged on the other surface portion side of the second glass substrate. Light transmitted through the polarization plates passes through the refractive index distribution lens array 111, whereby the film F is exposed.

As described above, the conventional line-scanning optical printer is designed so that the film F is exposed to the light emitted from the light source 108 and transmitted through the color filter (not shown) having three colors, R, G and B, which are arranged parallel to one another in the image sub-scanning direction, the liquid crystal light bulb 110, and the refractive index distribution lens array 111 by means of the optical fiber bundle 109. With this arrangement, not only the members constituting the optical system are costly but also assembling involves a number of complicated processes thereby increasing the total cost of the apparatus.

Conventionally, therefore, avoiding the use of a costly optical fiber bundle, there has been used an optical device manufactured by utilizing an optical system that is composed of a lens, concave mirror, flat mirror, etc., which can be formed of plastics at low cost. According to this conventional optical device, however, an image is formed on a sheet by utilizing a spot light source, so that the quantity of light emitted from the spot light source cannot be distributed uniformly. Thus, unevenness in brightness is caused such that the central portion of the spot light source is brighter than the peripheral portion.

DISCLOSURE OF THE INVENTION

The object of the present invention is to provide a line-scanning optical printer capable of obtaining uniform-density images without entailing unevenness in brightness, incorporating a low-cost optical device constituting an optical system made available with low-cost constituent members and reduced number of assembly processes.

In order to achieve the above object, a line-scanning optical printer according to the present invention, which is designed to form an image on a sensitized material by projecting a linear light having a given width and length thereto while successively scanning individual lines in the direction of the width, comprises a casing having light shielding properties and including a window portion for radiating the linear light to the outside, a light emitting element which substantially functions as a point light source and is stored in the casing, an optical system for guiding light from the spot light source or light emitting element as the linear light to the window portion, and a liquid crystal optical shutter attached to the window portion.

BRIEF DESCRIPTION OF THE DRAWINGS

FIG. 6A is a sectional view taken along line G—G of FIG. 5A;

FIG. 6B is an enlarged view showing a portion surrounded by a circle K of FIG. 5B;

FIG. 7A is a front view of an assembly of an optical mask member and a light emitting element holder taken along line L—L of FIG. 5B;

FIG. 7B is a top view corresponding to FIG. 7A;

FIG. 7C is a sectional view taken along line M—M of FIG. 7A;

BEST MODE FOR CARRYING OUT THE INVENTION

An outline of the configuration and operation of a line-scanning optical printer according to the present invention will now be described with reference to FIGS. 1 and 2. The optical printer described below is connected to a video apparatus that generates video signals, and is used to print a displayed picture on a sheet or is used as a video printer.

A sensitized sheet tray 20 is installed in a housing 10 so that it can be taken in and out like a drawer. Facing the photosensitive surface of a sensitized sheet 25 that is loaded in the sensitized sheet tray 20, a scanning head 40 is mounted for reciprocation in the directions of arrows B and C. The scanning head 40 constitutes a device for converting electrical signals into light signals in the optical printer shown in FIG. 1.

Figure 1:
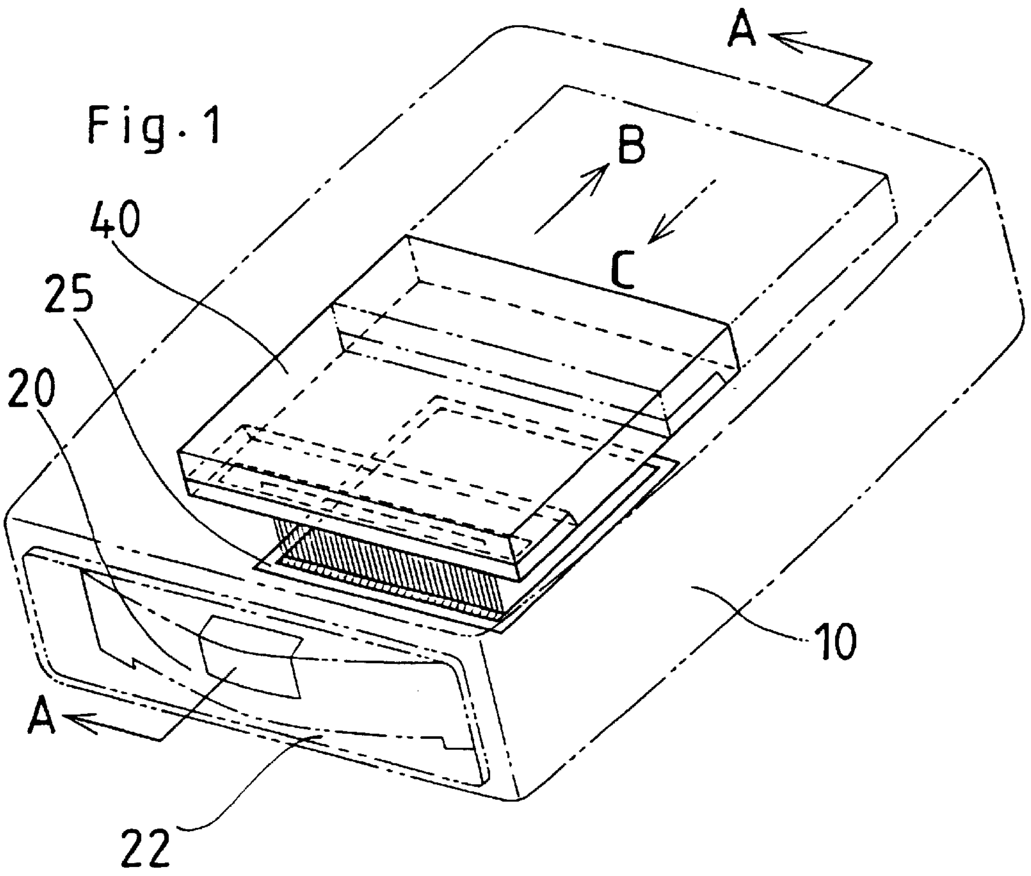
FIG. 1 is a perspective view of a line-scanning optical printer according to the present invention shortly after the beginning of the printing operation.
Figure 2:
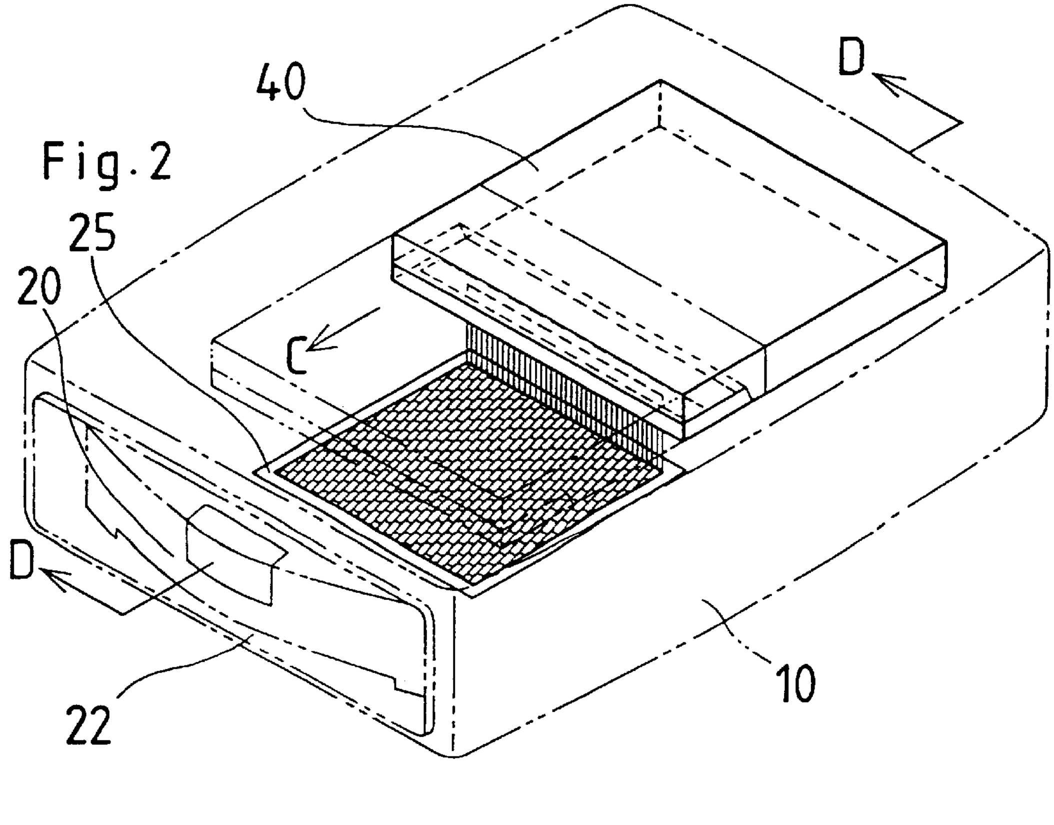
FIG. 2 is a perspective view of the optical printer shown in FIG. 1, at the end of the printing operation.

FIG. 1 shows a state in which the sensitized sheet 25 is exposed for printing as the scanning head 40 is run a short distance in the direction of arrow B from its home position. The scanning head 40 further runs in the direction of arrow B from the position shown in FIG. 1, making the sensitized sheet 25 exposed to the light for printing. When the exposure for printing is finished, the scanning head 40 then goes back in the direction of arrow C that is opposite to the direction of arrow B and returns to the home position. The sensitized sheet 25, having a latent image of the picture formed thereon by the exposure for print, undergoes development process, and is discharged through a sensitized sheet exit 22 in the front face.

An outline of the configuration of the aforementioned optical printer will further be described with reference to FIG. 3.

The housing 10 is fitted with the sensitized sheet tray 20 so as to be taken in and out like a drawer. The sensitized sheet tray 20 is loaded with a sensitized sheet pack 24. The sensitized sheet pack 24 is stored with a plurality of sensitized sheets 25 with their photosensitive surfaces facing upward. Each sensitized sheet is made of a film with a self-developing solution applied thereon.

The sensitized sheet tray 20 is provided with a knob 21 for drawing it out of the housing 10, the sensitized sheet exit 22 through which each printed sensitized sheet 25 is discharged, and sensitized sheet discharging rollers 23 for developing the sensitized sheet 25, having the latent image of the picture formed thereon by the exposure for print, and delivering it to the outside through the sensitized sheet exit 22.

Further, an optical print unit 30 is stored in the housing 10. The optical print unit 30 includes a control circuit 31 for controlling the optical printer, the scanning head 40 for use as a device for converting electrical signals into light signals and radiating them and converting electrical signals for the formation of the picture on the sensitized sheet 25 into light signals, a scanning motor (not shown) for reciprocating the scanning head 40 for scanning along the surface of the sensitized sheet 25, a pulley 32 adapted to be engagedly rotated by the scanning motor, and a scanning wire 33 engaged with the scanning head 40 and adapted to convert a rotary motion of the pulley 32 into a linear motion, thereby reciprocating the scanning head 40 for scanning along the surface of the sensitized sheet 25.

An outline of the configuration of the scanning head 40 will further be described with reference to the enlarged view of FIG. 4.

The scanning head 40 includes a casing 50, which is formed so as not to allow inside light to leak out. The casing 50 is composed of a casing body 51 and a cover 57. Scattered light preventing projections 58 are formed individually on the respective inner wall surfaces of the casing body 51 and the cover 57.

The casing 50 contains therein a light emitting element 60, an optical system, and an optical shutter 80. The light emitting element 60 substantially functions as a point light source that emits light to which the sensitized sheet 25 is to be exposed. The optical system converts the light emitted from the light emitting element 60 into a narrow rectilinear parallel light which is radiated toward the sensitized sheet 25. The optical shutter 80 includes a plurality of shutter elements, which are arranged in a straight line along the parallel light radiated from the optical system to cut off transmission of the light for each unit area in accordance with an electrical signal, thereby forming pixels on the sensitized sheet 25.

Figure 8A:
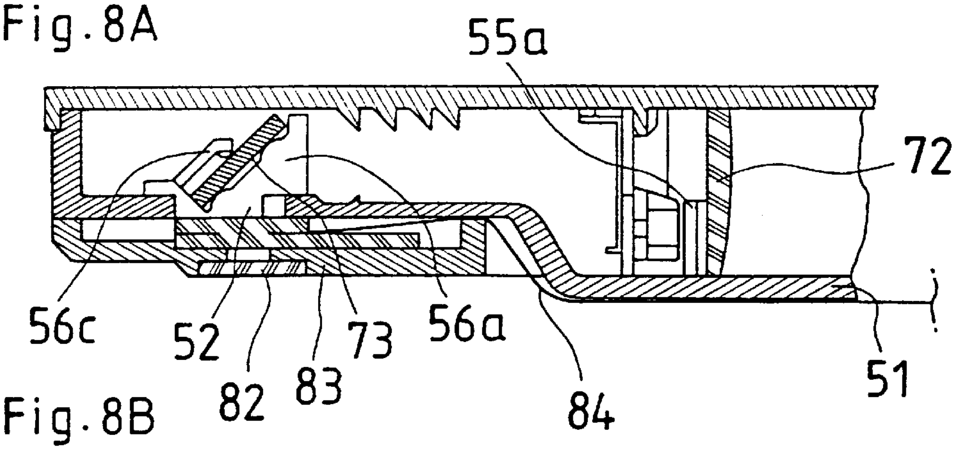
FIG. 8A is a sectional view taken along line H—H of FIG. 5A.
Figure 8B:
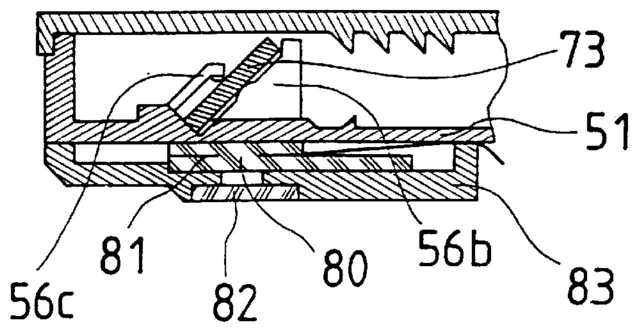
FIG. 8B is a sectional view taken along line J—J of FIG. 5A.

A liquid crystal is used as the optical shutter. The liquid crystal optical shutter 80 is mounted from outside the casing 50, and is covered by a protective member 83 that is fixed to the casing body 51. As shown in FIG. 8A, the protective member 83 is formed with a window through which light from the optical shutter 80 is transmitted to the sensitized sheet 25, and a protective glass 82 is attached to the window portion. The window portion is provided on a surface extending substantially parallel to a plane that contains the light emitting element 60 and a spherical concave mirror 71 (mentioned later). Further, the liquid crystal optical shutter 80 is supplied with a driving signal from the control circuit 31 through a first FPC (flexible printed circuit) 84. The optical shutter 80 and the first FPC 84 are fixed to the casing 50 by attaching the protective member 83 to the casing body 51 of the casing 50, as shown in FIG. 8B. In FIG. 8A, numeral 81 denotes a match member that is attached to the liquid crystal optical shutter 80.

The light emitting element 60 is composed of LEDs of at least three colors, R (red), G (green), and B (blue). The light emitted from the light emitting element 60 is converted into the narrow rectilinear parallel light and radiated onto the sensitized sheet 25. Power to the light emitting element 60 is supplied through a second FPC 85 (see FIG. 7B).

An optical system of the scanning head 40 is composed of a toroidal lens 72, the spherical concave mirror 71, and a plane mirror 73. The lower half of the lens 72 functions as an optical path changing lens for refracting the light emitted horizontally from the light emitting element 60 substantially functioning as a point light source, toward the spherical concave mirror 71. The upper half of the lens 72 has a function to refract the light converted into the substantially rectilinear parallel light in the horizontal direction so that it is focused on the photosensitive surface of the sensitized sheet 25. The mirror 71 serves to convert the light transmitted through the optical path changing lens, which is formed integrally with the lower half of the toroidal lens 72, into a substantially rectilinear parallel light in the horizontal direction and reflect it. The mirror 73 serves to convert the substantially horizontal light transmitted through the toroidal lens 72 substantially in the vertical direction and reflect it toward the sensitized sheet 25 thereunder.

The configuration of this optical system will further be described with reference to FIGS. 5A and 5B.

Figure 5A:
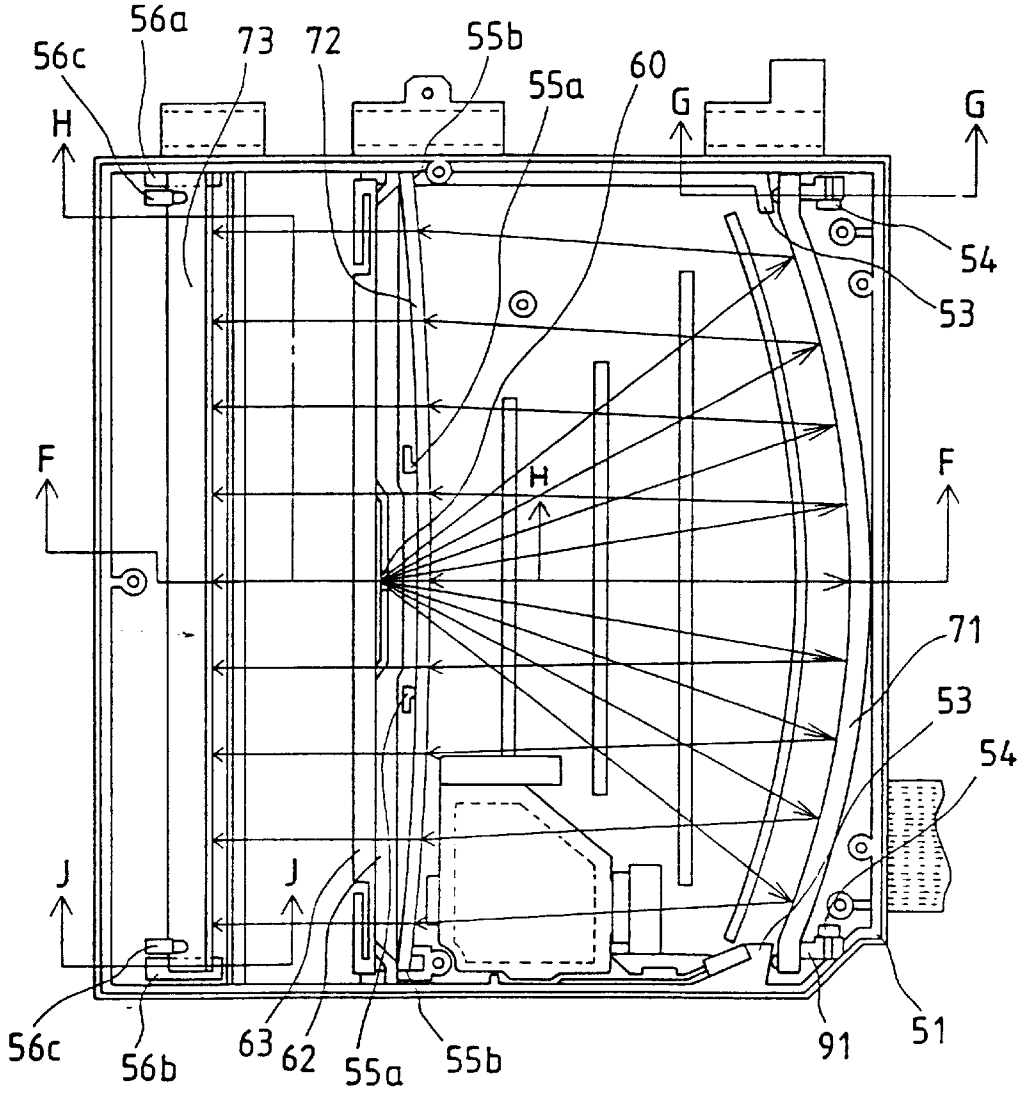
FIG. 5A is a top interior view of a scanning head of the optical printer shown in FIG. 3, with its cover removed.
Figure 5B:
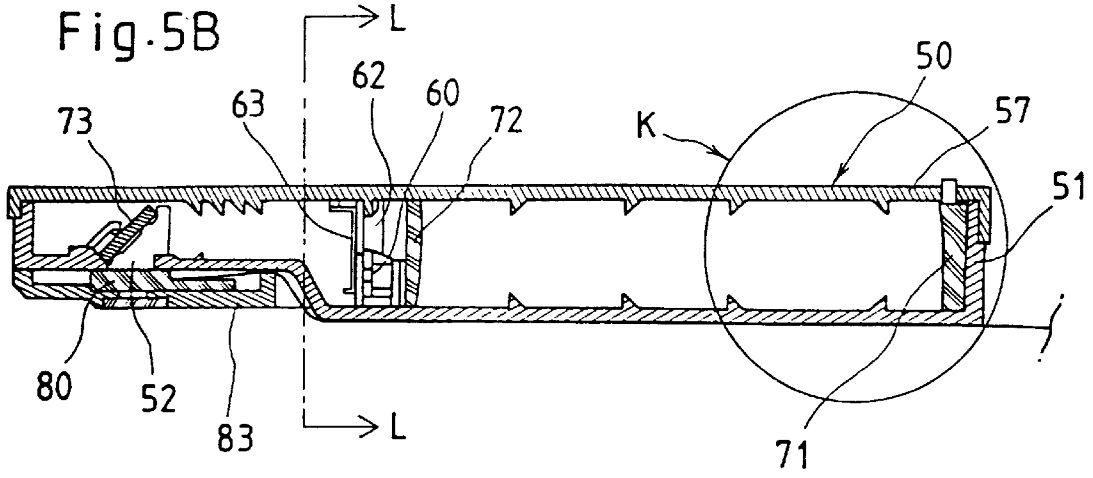
FIG. 5B is a sectional view taken along line F—F of FIG. 5A, in which the scanning head is fitted with the cover.

As shown in FIG. 5B, a window portion 52 is formed on the undersurface of the casing 50. As shown in FIG. 7B, moreover, the casing 50 contains a fixed assembly that includes the light emitting element 60, substantially functioning as a point light source that emits the light to which the sensitized sheet 25 is exposed, a light emitting element substrate 61 on which the light emitting element 60 is fixed, a light emitting element holder 62 on which the light emitting element substrate 61 is fixed so that the light emitting element 60 is held in a fixed position in the casing 50, and an optical mask member 63 for partially restricting the passage of the light that is emitted from the light emitting element 60.

The substrate 61, which transmits light, is attached to the casing 50 so that its outer and inner surfaces are exposed to the outside and inside of the casing 50, respectively, and supplies electric power to the light emitting element 60 from outside the light emitting element 60 through the second FPC 85 that is connected to a connector on the side exposed outside of the substrate 61.

Further, the casing 50 incorporates the spherical concave mirror 71 for converting the light emitted from the light emitting element 60, substantially functioning as a point light source, into the substantially rectilinear parallel light, the toroidal lens 72 for refracting the light converted into the substantially rectilinear parallel light by means of the spherical concave mirror 71 so that it is focused on the photosensitive surface of the sensitized sheet 25, and the plane mirror 73 for refracting the substantially horizontal light, transmitted through the toroidal lens 72, substantially in the vertical direction toward the sensitized sheet 25 thereunder.

Two opposite end portions of the spherical concave mirror 71, which is arcuated in the lengthwise direction of the rectilinear parallel light, are held between concave mirror support portions 53 and backup spring support 54, which are formed at two positions on the casing body 51, by means of concave mirror backup springs 90, which will be mentioned later.

The optical shutter 80, which includes a plurality of shutter elements arranged in a straight line along the parallel light radiated from the optical system and capable of cutting off transmission for each unit area in accordance with an electrical signal, thereby forming pixels on the sensitized sheet 25, is attached to the undersurface of the casing body 51 so as to close the window portion 52. Thus, not only the cost of the constituent members of the optical system but also the number of assembly processes can be reduced. The optical shutter 80 is protected by means of the protective glass 82 (see FIG. 8B). Light transmitted through the optical shutter 80 passes through the protective glass 82 and reaches the sensitized sheet.

Referring now to FIGS. 5A to 6B, there will be described a state in which the spherical concave mirror 71 is attached to the casing body 51.

The opposite end portions of the arcuate concave mirror 71 are held respectively between the concave mirror support portions 53 and the backup spring support portions 54, which are formed in the two positions on the casing body 51, by means of the concave mirror backup springs 90, which will be mentioned later. As shown in FIG. 6A, a projection 71*a* is formed on each end portion of the spherical concave mirror 71. The projections 71*a* abut respectively against the concave mirror support portions 53 that are formed at the two positions on the casing body 51. The spherical concave mirror 71 are pressed against the concave mirror support portions 54 by means of the concave mirror backup springs 90 that are inserted and fixed respectively in hole portions of the backup spring support portions 54 that are formed at the two positions on the casing body 51.

As shown in FIG. 6B, moreover, a concave mirror support spring 91, a helical compression spring, is interposed between the undersurface of the central portion of the spherical concave mirror 71 and the casing body 51, and pushes up the central portion of the spherical concave mirror 71.

An inclination adjusting member 92 is screwed into the cover 57 of the casing body 50. The spherical concave mirror 71 is designed so that its central portion can be pressed down against the lifting force of the concave mirror support spring 91 as the inclination adjusting member 92 is screwed in further. Thus, the position for irradiation can be easily adjusted to the position of the optical shutter 80 by regulating the length of engagement of the inclination adjusting member 92.

Referring to FIGS. 5A and 5B, there will be described a state in which the toroidal lens 72 is attached to the casing body 51.

The casing body 51 is formed with toroidal lens end support portions 55*b* and also with toroidal lens center support portions 55*a* at two places respectively. In installing the toroidal lens 72 to the casing body 51, the toroidal lens 72, which is formed straight, is slightly curved as it is inserted between the two toroidal lens end support portions

55*b* and the two toroidal lens center support portions 55*a*. Thereupon, the toroidal lens 72 is fixed to the casing body 51 by means of its own elasticity.

Thus, the toroidal lens 72 may be formed straight, with the result that a molding tool can be manufactured at low cost. Since the toroidal lens 72 can be installed to the casing body 51 by being inserted between the toroidal lens end support portions 55*b* and the toroidal lens center support portions 55*a*, moreover, its assembly is easy.

Referring to FIGS. 7A to 7C, there will be described the construction of the assembly that includes the light emitting element substrate 61 on which the light emitting element 60 is fixed, the light emitting element holder 62 for holding the light emitting element substrate 61, and the optical mask member 63 for partially restricting the passage of the light that is emitted from the light emitting element 60.

The light emitting element holder 62 is fitted with the light emitting element substrate 61 that fixedly holds the light emitting element 60 and also with the optical mask member 63. The optical mask member 63 is formed with a slit-shaped aperture 64. The aperture 64 has wide opposite end portions with a width Ww and a narrow central portion with a width Wn.

Referring now to FIG. 5A, there will be described the reason why the aperture 64 of the optical mask member 63 is formed having the wide opposite end portions with the width Ww and the narrow central portion with the width Wn. The light emitted from the light emitting element 60, which is radiated in a wide circle around the front face, has higher luminous intensity in the central portion and lower luminous intensity in the periphery. Thus, if the light emitted from the light emitting element 60 is allowed to directly reach the sensitized sheet 25 as an image forming area, the density varies between the central portion and peripheral portion of the image, so that the image quality lowers. A uniform-density image can be obtained, therefore, by restricting the higher-intensity light in the central portion more than the light in the periphery in order to eliminate the unevenness of the image density.

Referring to FIGS. 5A and 5B, there will be described a structure for attaching a flat mirror 73 to the casing body 51.

As shown in FIG. 5A, a left-hand flat mirror support portion 56*a*, a right-hand flat mirror support portion 56*b*, and flat mirror hold-down portions 56*c* opposite the support portions 56*a* and 56*b* are formed respectively in those parts which are located close to two opposite end portions of the flat mirror 73.

Referring to FIGS. 8A and 8B, there will be described a state in which the flat mirror 73 is attached to the casing body 51.

As shown in FIG. 8A, the left-hand end portion of the flat mirror 73 is held between the left-hand flat mirror support portion 56*a* and the corresponding flat mirror hold-down 56*c*, while as shown in FIG. 8B, the right-hand end portion of the flat mirror 73 is held between the right-hand flat mirror support portion 56*b* and the corresponding flat mirror hold-down portion 56*c*.

Two projections (see FIG. 8A) for supporting the left-hand end portion of the flat mirror 73 are formed on the left-hand flat mirror support portion 56*a*, while one projection (see FIG. 8B) for supporting the right-hand end portion of the flat mirror 73 is formed on the right-hand flat mirror support portion 56*b*. Thus, the flat mirror 73 are pressed against the two projections on the left-hand flat mirror support portion 56*a* and the one projection on the right-hand flat mirror support portion 56*b* by means of the flat mirror hold-down portions 56*c* so as to be held between them, that is, the flat mirror 73 is supported by means of the three projections in all. Therefore, even if the three projections differ in height, the flat mirror 73, can be kept fixed because it is pressed equally against the three projections as it is held between them.

Figure 3:
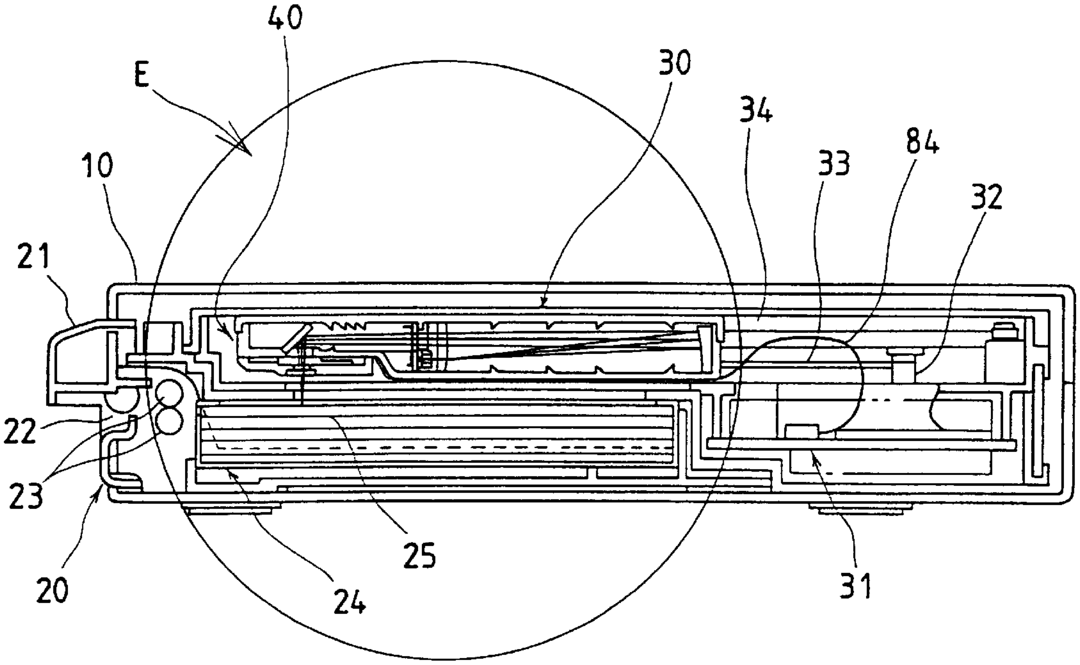
FIG. 3 is a sectional view taken along line A—A of FIG. 1.
Figure 4:
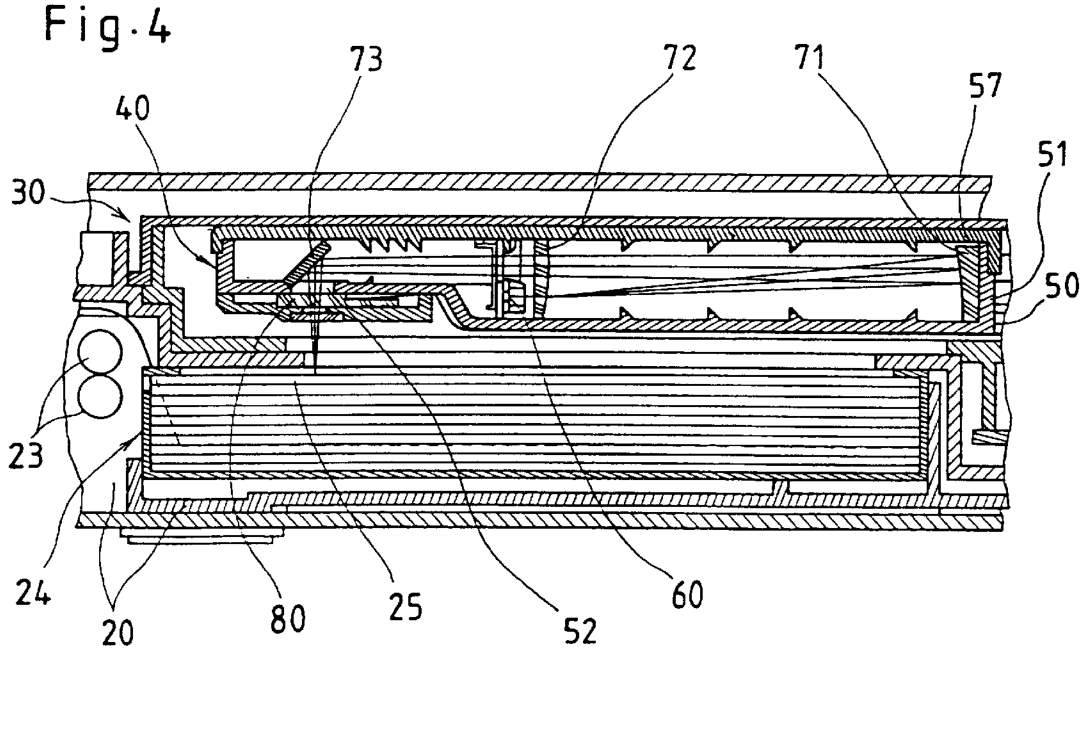
FIG. 4 is an enlarged view showing a portion surrounded by a circle E of FIG. 3.

Referring now to FIGS. 3 and 4, there will be described the operation of the optical printer constructed in the aforesaid manner.

First, the optical printer is connected to the video apparatus (not shown) that generates video signals, the power source of the optical printer is turned on, and the sensitized sheet tray 20 set in the housing 10 is drawn out with a hand by pulling the knob portion 21. The sensitized sheet tray 20 is loaded with the sensitized sheet pack 24 that is packed with a plurality of sensitized sheets 25, and is set in the housing 10.

If a print command is given in this state, the light emitting element 60 emits light, and the light emitted from the light emitting element 60 is reflected to be converted into the substantially rectilinear parallel light by the spherical concave mirror 71. The light converted into the substantially rectilinear parallel light by the spherical concave mirror 71 is refracted by the toroidal lens 72 so that it is focused on the photosensitive surface of the sensitized sheet 25. The substantially horizontal light transmitted through the toroidal lens 72 is refracted substantially in the vertical direction by being reflected by the flat mirror 73 and projected to the photosensitive surface of the sensitized sheet 25, although the light is usually intercepted by means of the optical shutter 80.

When a video signal is delivered from the video apparatus to the optical printer, the control circuit 31 actuates the scanning motor (not shown) to rotate the pulley 32, and causes the scanning wire 33 to move the scanning head 40 at its home position shown in FIGS. 1 and 3 in the direction of arrow B in FIG. 1 at a constant speed. At the same time, the control circuit 31 outputs an optical shutter driving signal in accordance with the video signal, thereby actuating the shutter elements of the optical shutter 80, which are arranged in a straight line in a direction perpendicular to the moving direction of the scanning head 40, to transmit the light selectively.

Figure 9:
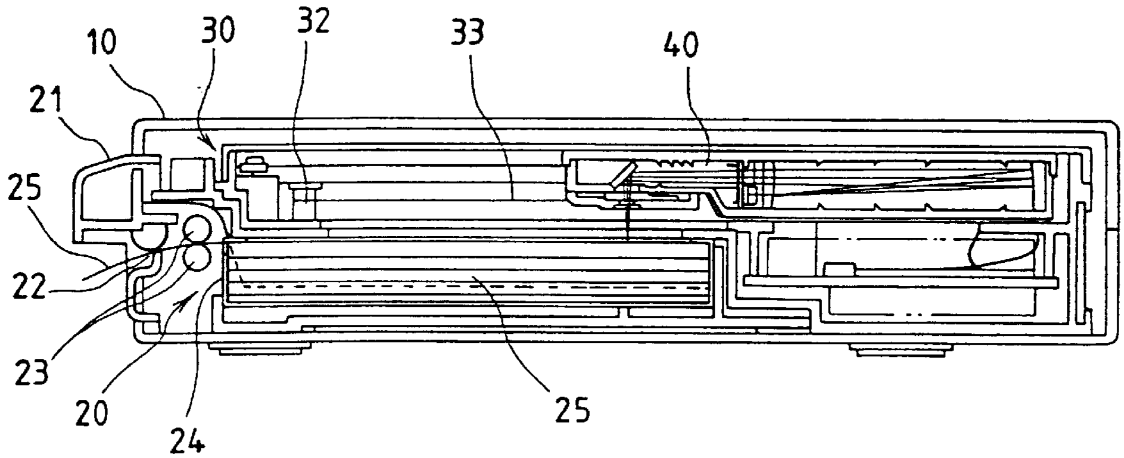
FIG. 9 is a sectional view taken along line D—D of FIG. 2.

First, a latent image of a first pixel line is formed. As the scanning head 40 moves further, latent images of second and third pixel lines are formed successively on the photosensitive surface of the sensitized sheet 25. When the scanning head 40 reaches its end point shown in FIGS. 2 and 9, the latent image of the picture is completed. After reaching the end point, the scanning head 40 returns to the home position shown in FIGS. 1 and 3. The sensitized sheet 25, having the latent image of the picture formed thereon, is developed by means of the sensitized sheet discharging rollers 23 as it is sent out through the sensitized sheet exit 22.

According to the present invention constructed in the manner described above, the optical system is composed of the concave mirror, toroidal lens, and flat mirror. Thus, the constituent members of the optical system are available at low costs, and the number of assembly processes can be reduced, so that a low-priced electrical-to-optical signal converter can be obtained.

Referring now to FIGS. 10 to 17, there will be described one modification of the optical printer described above with reference to FIGS. 3 to 9.

An outline of the configuration of this optical printer will be described with reference to FIGS. 10 and 11. A sensitized sheet processing unit 42 and an optical print unit 30 are incorporated in the housing 10.

The sensitized sheet processing unit 42 is composed of a sensitized sheet tray 20, which is used to load a sensitized sheet pack 24 that is stored with a plurality of sensitized sheets 25, and a sensitized sheet tray holder 26 (see FIG. 12), which holds the sensitized sheet tray 20 in a manner such that the tray 20 can be drawn out. The front face of the sensitized sheet tray 20 is formed with a knob portion 21 for drawing out the tray 20 from the housing 10 and a sensitized sheet exit 22 through which each printed sensitized sheet 25 is discharged. Further provided are sensitized sheet discharging rollers 23 that are used to develop the sensitized sheet 25 where a latent image of a picture has been formed by exposure for print, and deliver it to the outside through the sensitized sheet exit 22.

Figure 10:
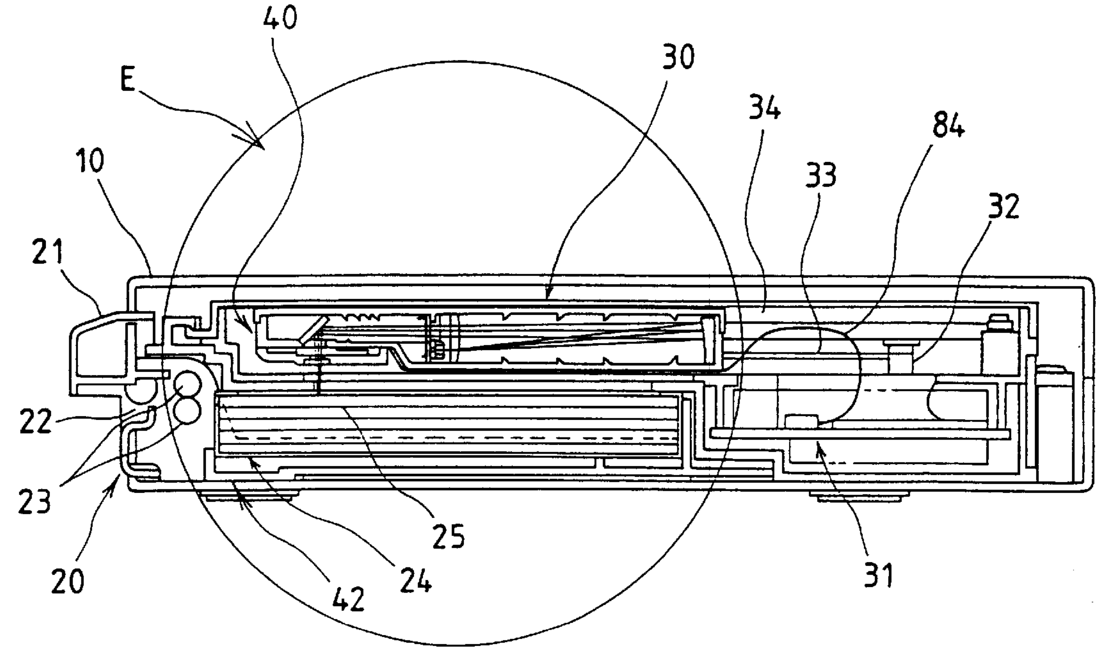
FIG. 10 is a sectional view taken along line A—A of FIG. 1, showing one modification of an embodiment shown in FIG. 3.
Figure 11:
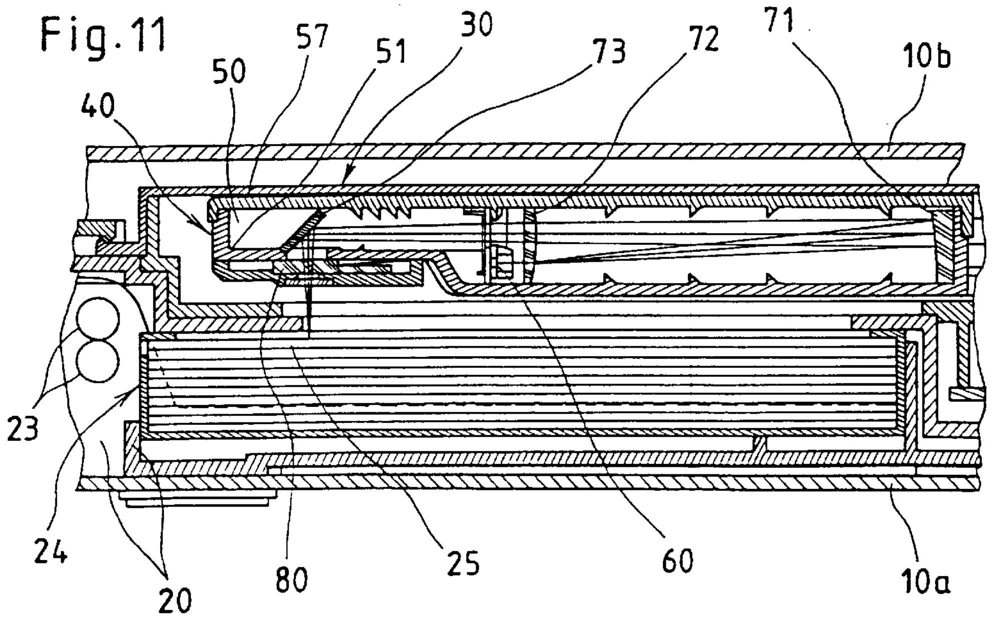
FIG. 11 is an enlarged view showing a portion surrounded by a circle E of FIG. 10.
Figure 12:
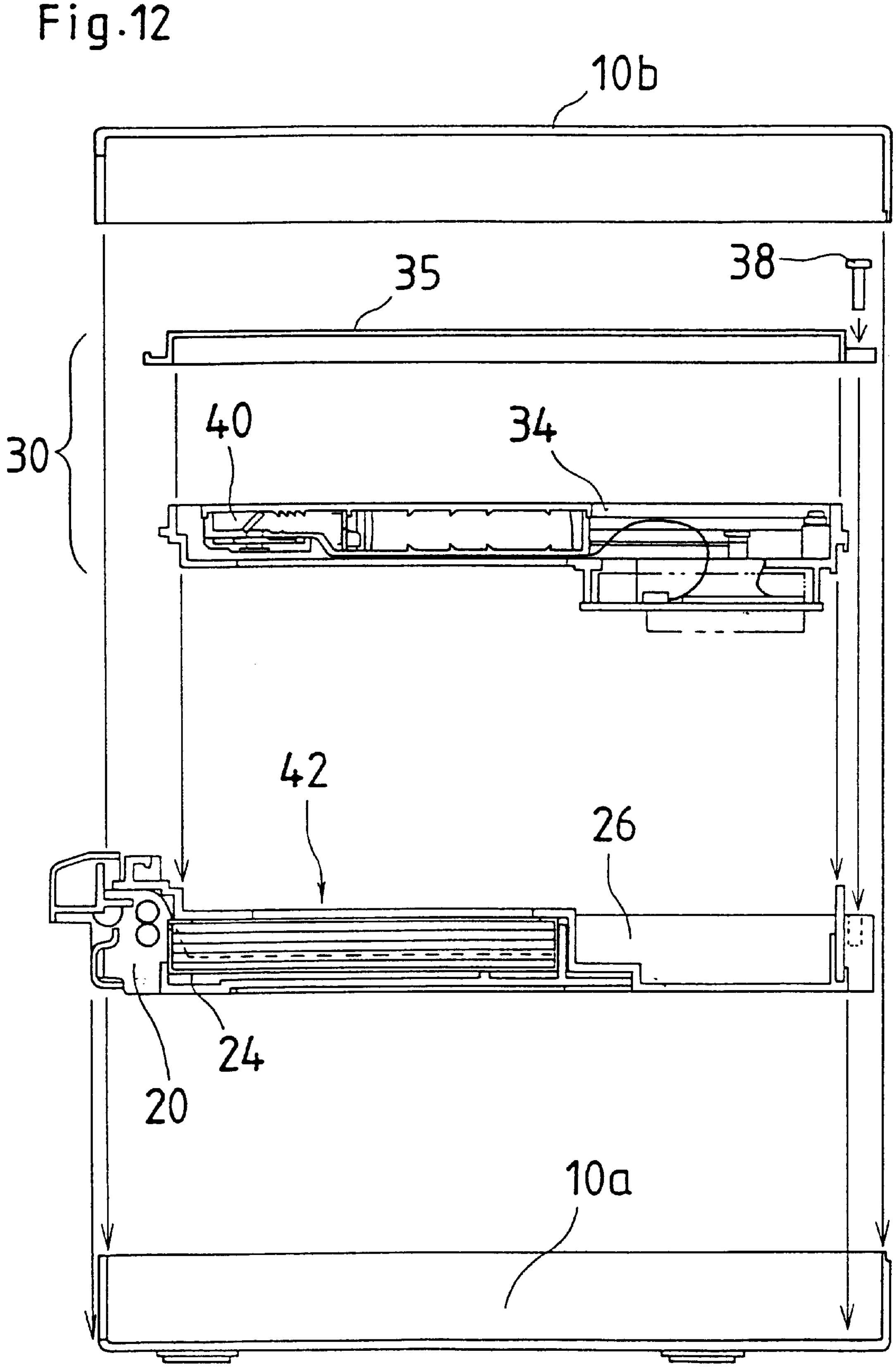
FIG. 12 is a diagram for illustrating the basic configuration of an optical printer shown in FIG. 10.

As shown in FIGS. 10 and 12, the optical print unit 30 is composed of a print scanning holder 34 as a casing and a print scanning holder cover 35 as a cover member. The print scanning holder 34 contains therein a scanning head 40 for use as an electrical-to-optical signal converter for converting electrical signals into light signals and radiating them and forming an image on each sensitized sheet 25, a print scanning mechanism (including a scanning wire 33 and a pulley 32) for reciprocating the scanning head 40 for scanning in the longitudinal direction or in the horizontal direction in FIG. 10 along the surface of the sensitized sheet 25, and a control circuit 31 for controlling the optical printer.

An outline of the configuration of the scanning head 40 will be described with reference to FIG. 11.

The scanning head 40 comprises a casing 50 formed so as to prevent inside light from leaking out, a light emitting element 60 and an optical system arranged in the casing 50, and an optical shutter 80 located outside the undersurface of the casing 50.

The light emitting element 60 substantially functions as a point light source that emits light to which the sensitized sheet 25 is to be exposed. Light emitted from the light emitting element 60 is converted into a narrow rectilinear parallel light by means of the optical system (toroidal lens 72, spherical concave mirror 71, and flat mirror 73), and is radiated toward the sensitized sheet 25. The optical shutter 80 comprises a plurality of shutter elements arranged to cut off transmission for each unit area in accordance with an electrical signal, thereby forming pixels on the sensitized sheet 25.

A description of the optical system is omitted since it is identical with the one described before with reference to FIGS. 3 and 4.

Referring now to FIG. 12, there will be described the respective configurations of the optical print unit 30 and the sensitized sheet tray holder 26.

The sensitized sheet processing unit 42 and the optical print unit 30, each being constructed as an individual unit, are combined together, and a housing lower-half portion 10*a* and a housing upper-half portion 10*b* are attached to them.

The sensitized sheet processing unit 42 is obtained by attaching the sensitized sheet tray 20 to the sensitized sheet tray holder 26. Further, the optical print unit 30 is composed of the print scanning holder 34, which is fitted with the scanning head 40, and the print scanning holder cover 35.

More specifically, the print scanning holder 34, as the casing of the optical print unit 30, is attached to the sensitized sheet tray holder 26. Thus, the sensitized sheet tray holder 26 serves as the base of the print scanning holder 34 as the casing. FIG. 12 shows a state in which the sensitized sheet tray 20 is loaded with the sensitized sheet pack 24. The sensitized sheet pack 24 is packed with a plurality of sensitized sheets 25 with their photosensitive surfaces facing upward.

Referring now to FIGS. 13 to 16, there will be described steps of procedure for fixing the optical print unit 30 to the sensitized sheet tray holder 26 as the base.

Figure 13:
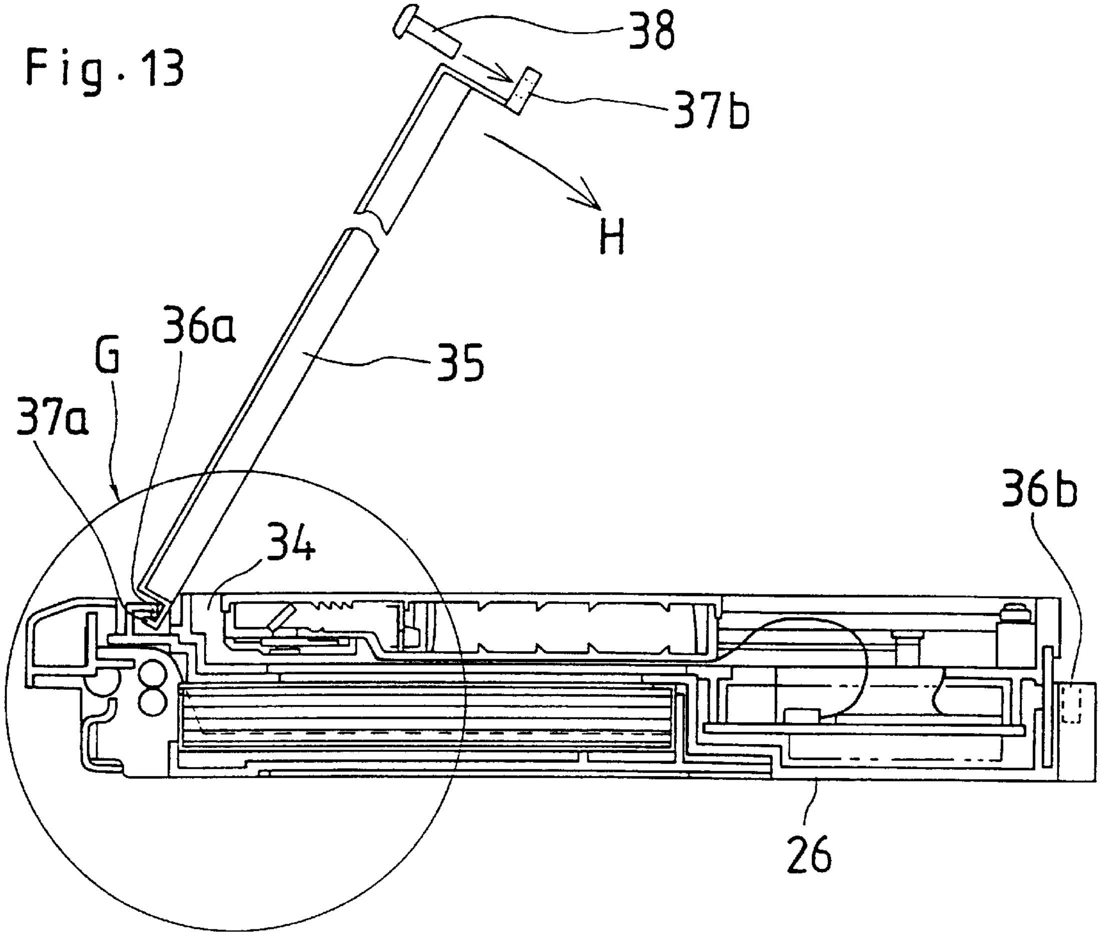
FIG. 13 is a diagram for illustrating a state where a print scanning holder cover is going to be attached and fixed to a sensitized sheet tray holder.
Figure 14:
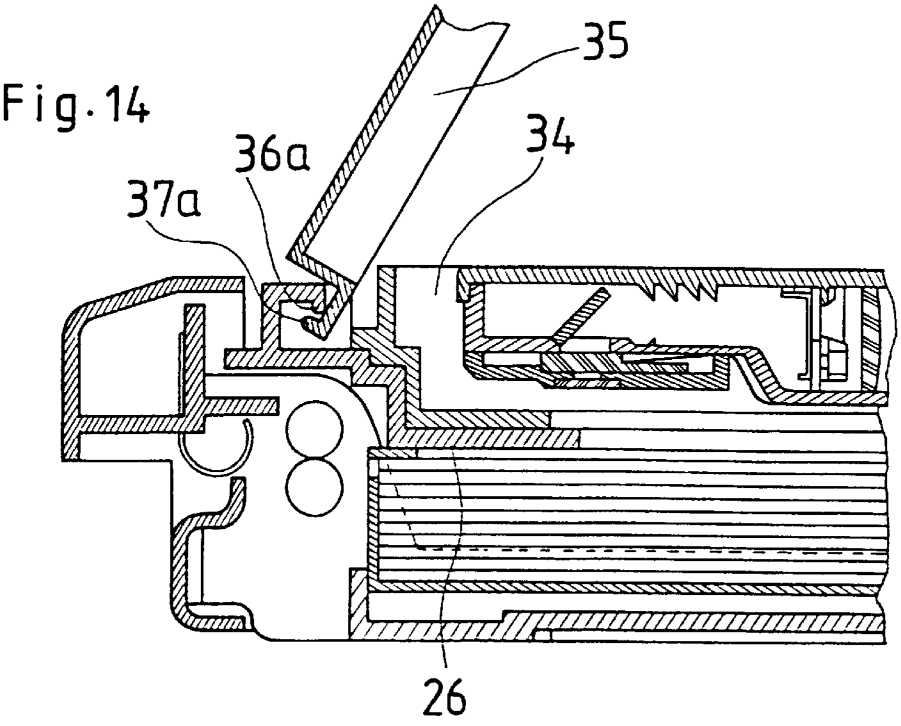
FIG. 14 is an enlarged view showing a portion surrounded by a circle G of FIG. 13.

As shown in FIGS. 13 and 14, the print scanning holder 34 is first installed in the sensitized sheet tray holder 26. Then, a base engaging portion 37*a* that is formed on the print scanning holder cover 35 is caused to engage a cover retaining portion 36*a* that is formed on the sensitized sheet tray holder 26.

Figure 15:
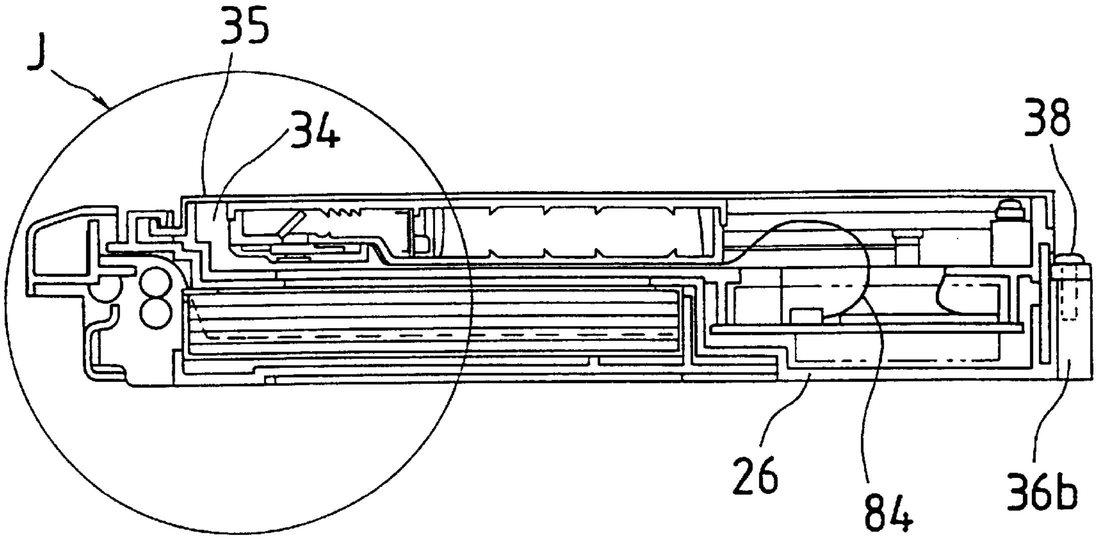
FIG. 15 is a diagram for illustrating a state where the print scanning holder cover has already been attached and fixed to the sensitized sheet tray holder.
Figure 16:
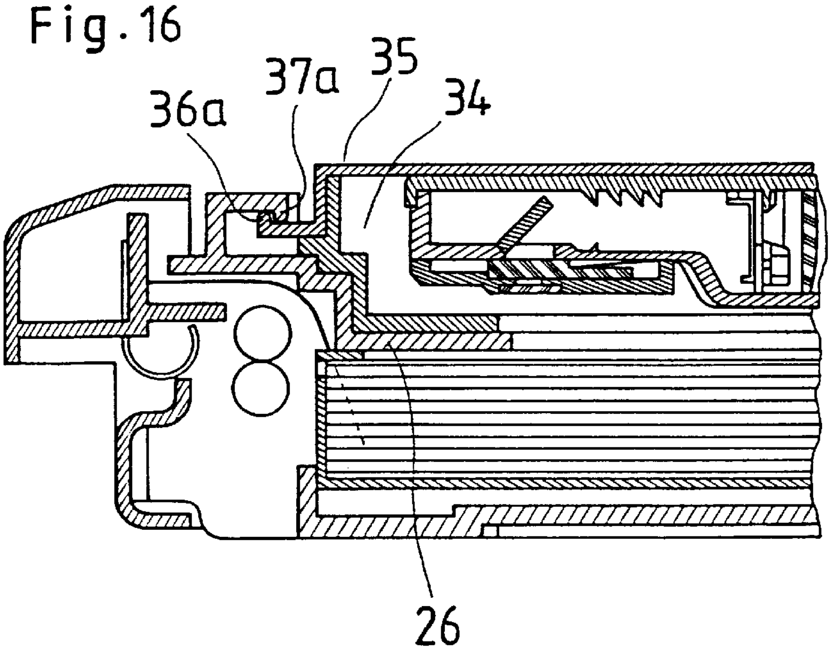
FIG. 16 is an enlarged view showing a portion surrounded by a circle J of FIG. 15.
Figure 17:
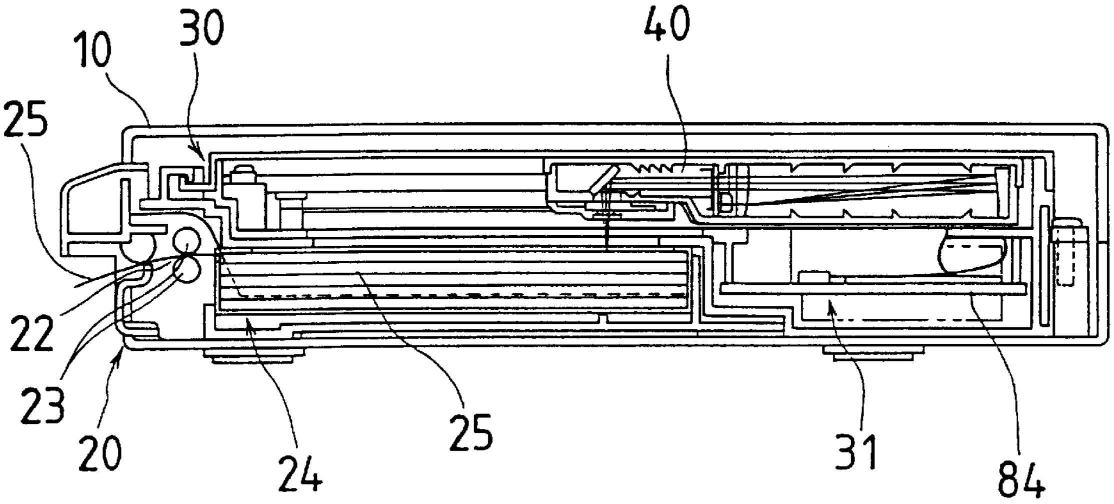
FIG. 17 is a sectional view taken along line D—D of FIG. 2, showing the same modification as the one shown in FIG. 10.

Then, the print scanning holder cover 35 is rotated around the base engaging portion 37*a* in the direction of arrow H of FIG. 13, whereupon it is put on the print scanning holder 34, as shown in FIGS. 15 and 16. Subsequently, a base fixing portion 37*b* (see FIG. 13), which is formed on the end portion of the print operation holder cover 35 which is situated opposite to the end portion having the base engaging portion 37*a* thereon, is fixed to a cover fixing portion 36*b* on the sensitized sheet tray holder 26 by means of fixing means 38 such as a screw. The fixing means 38 may be any other fixing member than a screw.

With use of the mounting structure described above, the print scanning holder 34, for use as the casing, can be attached and fixed to the sensitized sheet tray holder 26, as the base, without using any fixing member such as a screw.

According to the one modification described above with reference to FIGS. 10 to 17, the casing is mounted on the base in a manner such that the cover engaging portion and the base fixing portion each provided on the cover are caused to engage the cover retaining portion and the cover fixing portion each provided on the cover, respectively. Therefore, it is unnecessary to use the fixing member for attaching the casing to the base and the fixing member for attaching the cover to the casing, so that the number of components to be used can be reduced, and the cost of the apparatus can be lowered as a whole.

Further, there is no need of mounting work for mounting the casing on the base or mounting the cover on the casing by means of a fixing member or the like. Thus, the operating time is shortened, so that the work efficency is improved.

Figure 18:
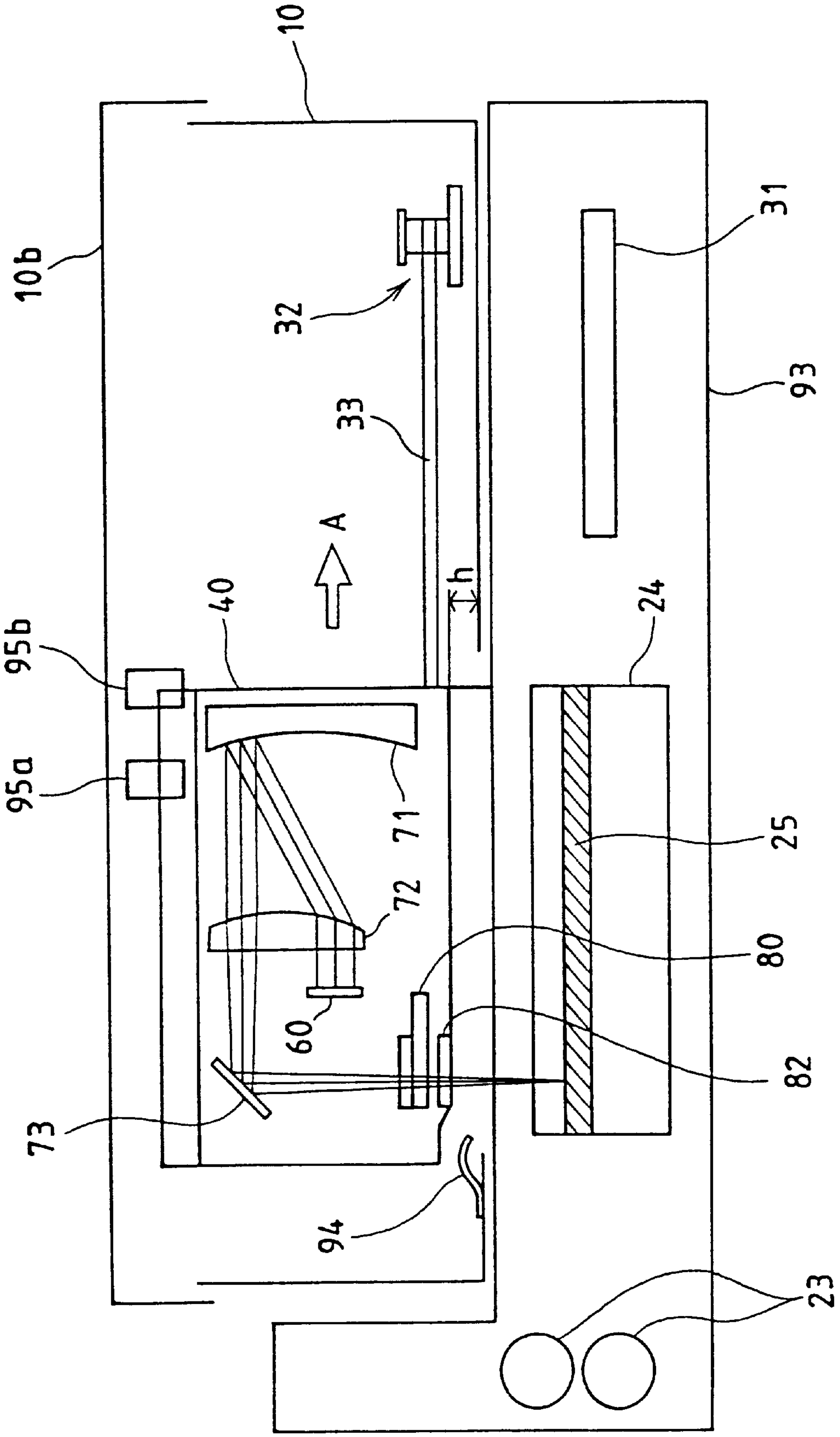
FIG. 18 is a view showing an outline of an optical printer fitted with a cleaning member for cleaning a protective glass of an optical shutter.

Referring now to FIGS. 18 to 20, there will be described an arrangement of a mechanism for cleaning the outer surface (surface opposite to the sensitized sheet 25) of the protective glass 82 (see FIG. 8B) for protecting the optical shutter 80 for preventing rubbish, dirt, dust, etc. from adhering to the outer surface of the protective glass 82 to form lines on the sensitized sheet 25, to degrade the image quality.

FIG. 18 shows an outline of the construction of the optical printer to which the cleaning member is attached. The construction of the optical printer shown in FIG. 18 itself is basically the same as the construction of the optical printer shown in FIGS. 1 to 17.

The housing 10 of the optical printer is situated on a platform 93. The housing 10 contains therein the casing 50 and a drive mechanism (scanning wire 33 and pulley 32) for the scanning head 40, and is provided with a cleaning member 94 on its bottom thereof. The housing 10 is covered by a top cover 10*b*.

The scanning head 40 contains therein an optical mechanism that is composed of the light emitting element 60 as an LED light source, toroidal lens 72, spherical concave mirror 71, and flat mirror 73 as a reflector. Further, the scanning head 40 is provided with the optical shutter 80 and the protective glass 82 for protecting the optical shutter 80.

The platform 93 contains therein the control circuit 31, sensitized sheet pack 24, and sensitized sheet discharging rollers (developing rollers) 23.

The cleaning member 94 is attached to the bottom portion of the housing 10 so as to get into a gap h between the protective glass 82 and the underside of the housing 10. The cleaning member 94 is arranged so that it comes into contact with the protective glass 82 under a given pressure, thereby cleaning the protective glass 82, when the scanning head 40 is situated in its shunting position mentioned later. The position of the scanning head 40 is detected by means of position sensors 95*a* and 95*b*.

The following is a description of an outline of the operation of the optical printer shown in FIG. 18.

The scanning head 40 (scanning head unit) is fed at a fixed speed in the direction of the arrow of FIG. 18 with respect to the sensitized sheet 25 by means of the drive mechanism (scanning wire 33 and pulley 32). As this is done, the optical mechanism 12 in the scanning head 40 exposes the sensitized sheets 25 in succession by line scanning through a window 43 on the underside of the housing 10, thereby forming images on the sensitized sheets 25.

The optical shutter 80 includes one scanning electrode and 640 signal electrodes, whereby 640 pixels are formed in the direction of the width of the sensitized sheet 25. The sensitized sheet 25 which contains a developing solution is discharged to the outside of the platform 93 after the developing solution is applied to the photosensitive surface by forced contact of the developing rollers 15 and developed.

Figures 19A, 19B:
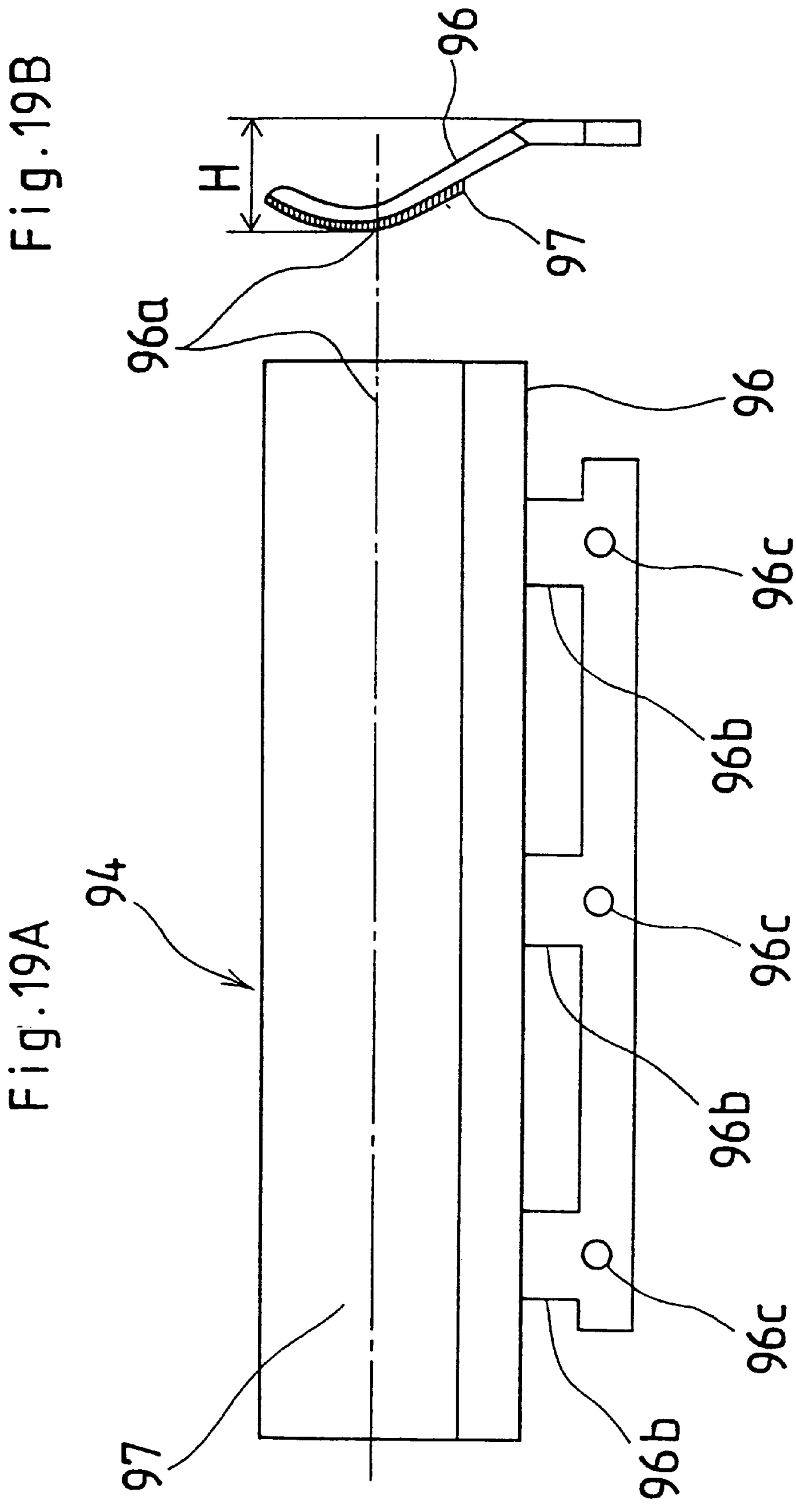
FIG. 19A is a front view of the cleaning member shown in FIG. 18.
FIG. 19B is a side view of the cleaning member shown in FIG. 18.

As shown in FIG. 19B, the cleaning member 94 is composed of a leaf spring 96 and a de-electrifying piece 97 fixed to its surface.

The construction of the cleaning member 94 will now be described with reference to FIGS. 19A and 19B.

A contact portion 96*a* on the distal end of the leaf spring 96 that constitutes the cleaning member 94 is curved so that it can be brought uniformly into contact with the protective glass 82 throughout its width, and a plurality of support branches 96*b*, e.g., three in number, are formed near the crosswise opposite ends and on the central portion of the basal part of the leaf spring 96. The leaf spring 96 is formed with screw holes 96*c* for fixation on the housing 10. The height H of the curved contact portion 96*a* of the leaf spring 96 is set to be a little larger (H>h) than the gap h (see FIG. 18) between the protective glass 82 and the underside of the housing 10. One end portion of the leaf spring 96 is fixed to the bottom portion of the housing 10, while the other end portion is made to come into contact with the surface of the protective glass 82 under the given pressure throughout the area of the contact portion 96*a*.

The de-electrifying piece 97 is bonded on the whole area of the contact portion 96*a* by adhesive so that the leaf spring 96 can contact the surface of the protective glass 82 uniformly and securely for obtaining high cleaning effect. Static electricity that is produced as the surface of the protective glass 82 is rubbed with the de-electrifying piece 97 can be transferred to cloth of the piece 97, while rubbish, dirt, dust, etc. are cleared by the cloth. Further, the protective glass 82 and the leaf spring 96, a metallic part, are not directly in contact with each other, that is, the curved surface of the de-electrifying piece 97 is in contact with the protective glass 82. Therefore, the de-electrifying piece 97 will not wear easily, and its life can be prolonged.

The operation of the scanning head 40 and cleaning operation by means of the cleaning member 94 will now be described with reference to FIGS. 20A to 20C.

Figures 20A, 20B, 20C:
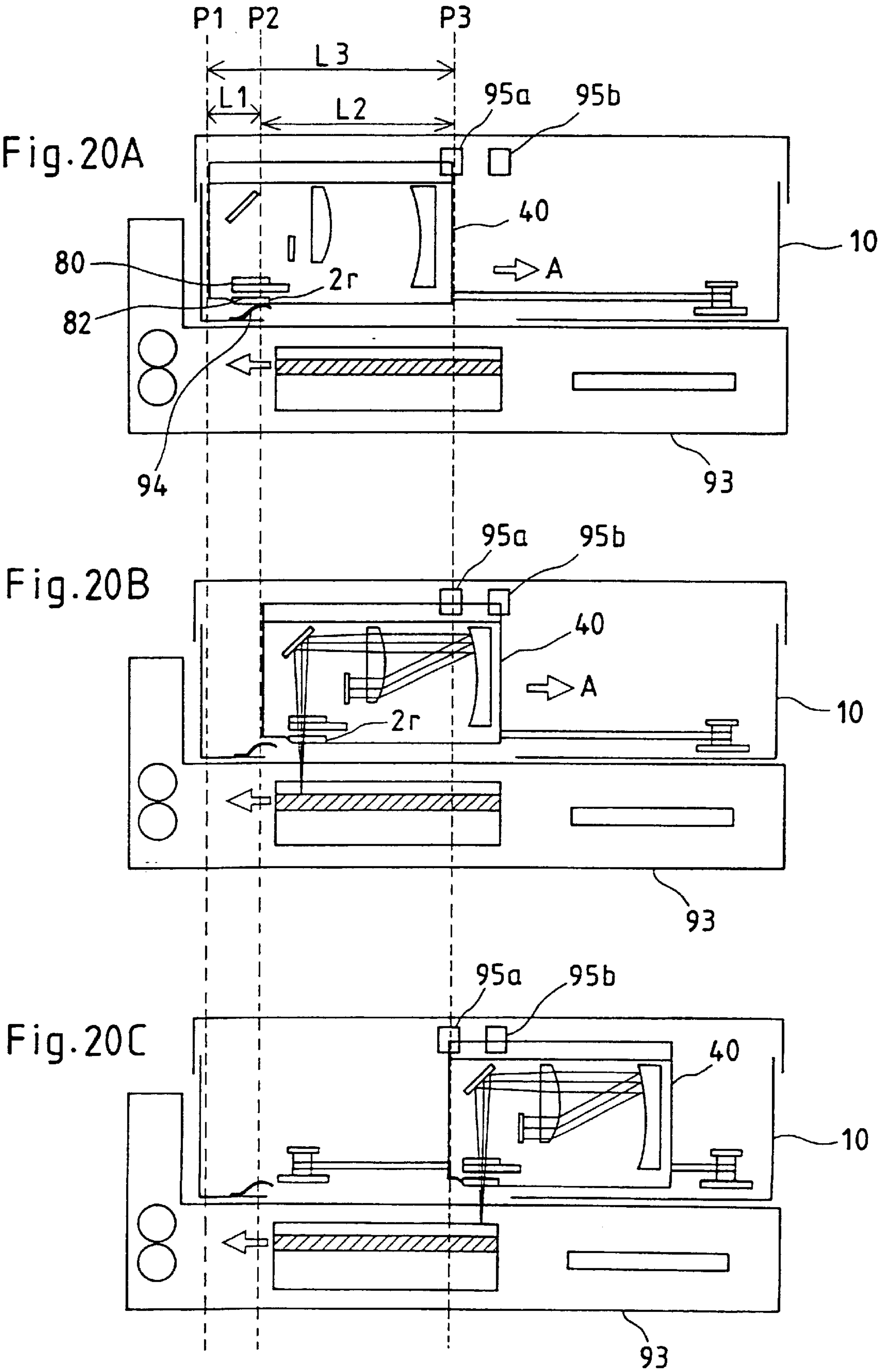
FIGS. 20A to 20C are diagrams for illustrating the operation of the optical printer of FIG. 18.
Figure 21:
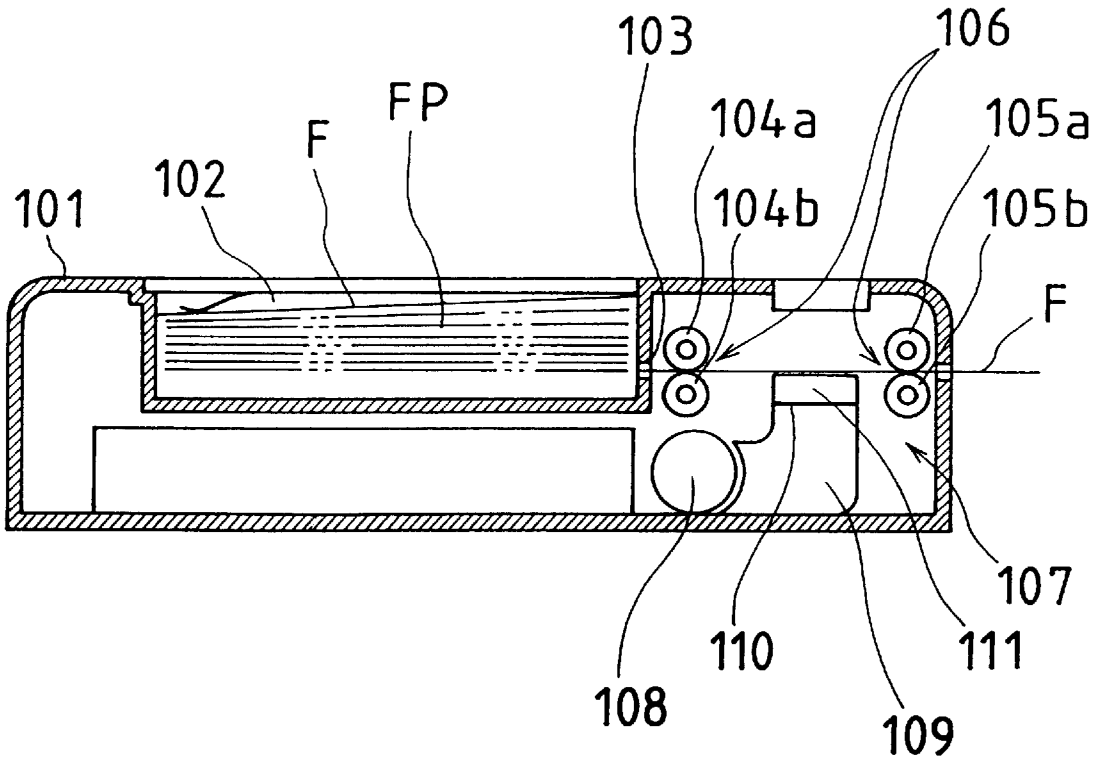
FIG. 21 is a sectional view showing a prior art example of a line-scanning optical printer.

FIG. 20A shows a state in which the scanning head 40 is in its shunting position, that is, an end of the scanning head 40 is situated in a first position P1. In this state, both the position sensors 95*a* and 95*b* are off.

Thereafter, the scanning head 40 moves in the direction of arrow A, thereby turning on both the position sensors 95*a* and 95*b* in the position shown in FIG. 20B. This position is a write start position such that the end of the scanning head 40 is situated in a second position P2. In this state, optical storage of image data in the sensitized sheet 25 is started.

The scanning head 40 writes the image data on the sensitized sheet 25 as it further moves in the direction of arrow A for scanning. During this process, both the position sensors 95*a* and 95*b* are on.

Then, when the scanning head 40 reaches a position shown in FIG. 20C, the position sensor 95*a* is turned off, and only the position sensor 95*b* remains turned on. This state corresponds to a write end position such that the end of the scanning head unit is in a third position P3. In this state, the storage process of the image data comes to an end, whereupon the scanning head 40 returns to its shunting position or the first position P1.

The distance between the second position P2 and the third position P3 is an effective scanning distance L2 of the scanning head 40. In FIG. 20A, L3 designates the scanning distance of the scanning head 40, and L1 designates the scanning distance of the scanning head 40 before the start of writing operation.

In FIG. 20A, the contact portion 96*a* of the leaf spring 96 is situated between the first position P1 and the second position P2 but closer to the second position P2, and the leaf spring 96 is located at the bottom of the housing 10 lest it interfere with the range of the effective scanning distance L2 of the scanning head 40. Accordingly, cleaning of the surface of the protective glass 82 by means of the leaf spring 96 is effected twice between the first position P1 and the second position P2 as the scanning head 40 reciprocates in the direction of arrow A and the opposite direction for scanning. Thus, rubbish, dirt, dust, etc. adhering to the surface of the protective glass 82 can be wiped off thoroughly.

According to the optical printer shown in FIG. 18, as described above, the leaf spring 96 that constitutes the cleaning member 94 is located in the housing 10 of the optical printer in a manner such that it is in contact with the protective glass 82 while the scanning head unit is located between its shunting position and the position for the start of writing operation, and that it is not in contact with the protective glass 82 while the scanning head unit is effectively operating for scanning. Thus, rubbish, dirt, dust, etc. adhering to the protective glass surface can be wiped off, so that the image quality will not be degraded.

Further, the contact portion of the leaf spring 96 is curved and a plurality of support branches are arranged in the width direction so that the leaf spring 96 can be brought uniformly into contact with the whole area of the protective glass in the width direction. Thus, rubbish, dirt, dust, etc. adhering to the protective glass surface can be wiped off evenly.

Furthermore, the contact portion of the leaf spring 96 is provided with the de-electrifying piece 97 to be brought into contact with the protective glass surface. Thus, static electricity can be removed, and rubbish, dirt, dust, etc. adhering to the protective glass surface can be wiped off more securely, so that the image quality will not be degraded.

What is claimed is:

1. A line-scanning optical printer designed to form an image on a sensitized material by projecting a linear light while successively scanning individual lines, said line-scanning optical printer comprising:

a light shielding casing having a window portion for radiating the linear light to the outside;

a light emitting element in the casing, wherein the light emitting element functions as a point light source;

an optical system, housed in said light shield casing, for guiding light from the point light source or light emitting element as the linear light to said window portion; and a liquid crystal optical shutter attached to said window portion.

2. A line-scanning optical printer according to claim 1, wherein said light emitting element is formed of LEDs.

3. A line-scanning optical printer according to claim 2, wherein said light emitting element is composed of LEDs of at least three colors, R, G and B.

4. A line-scanning optical printer according to claim 3, wherein said LEDs are mounted on an LED substrate and installed together with the LED substrate inside the casing by means of a holder.

5. A line-scanning optical printer according to claim 2, wherein said liquid crystal optical shutter is attached from outside of said casing.

6. A line-scanning optical printer according to claim 5, wherein said liquid crystal optical shutter is fitted with a protective member covering the whole area of the liquid crystal optical shutter except a light transmitting portion.

7. A line-scanning optical printer according to claim 6, wherein said liquid crystal optical shutter is connected with an FPC for giving an electrical signal for driving a liquid crystal signal.

8. A line-scanning optical printer according to claim 7, wherein said optical shutter and said FPC are fixed to said casing by attaching said protective member to said casing.

9. A line-scanning optical printer according to claim 8, wherein said casing is fitted with a light transmitting substrate with the obverse and reverse thereof exposed respectively to the outside and inside of said casing, and electric power is supplied from outside of said light emitting element through the FPC connected to a connector provided on the externally exposed surface side of the substrate.

10. A line-scanning optical printer according to claim 9, wherein said substrate is internally shielded from light by a cover member.

11. A line-scanning optical printer according to claim 1, wherein said optical system includes at least a concave mirror, and said linear light is formed by converting the radial light from the point light source or light emitting element into parallel light and reflecting the light by means of the concave mirror.

12. A line-scanning optical printer according to claim 11, wherein said concave mirror is mounted inside said casing in a manner such that the angle of vertical inclination of the reflective surface thereof is adjustable.

13. A line-scanning optical printer according to claim 12, wherein said linear light is focused on the sensitized material by means of a toroidal lens.

14. A line-scanning optical printer according to claim 13, wherein said concave mirror is a spherical concave mirror.

15. A line-scanning optical printer according to claim 14, wherein said light emitting element, said concave mirror, and said toroidal lens are stored in the casing to form an optical head, and said linear light is radiated to the outside through the window portion formed in the casing.

16. A line-scanning optical printer according to claim 15, wherein said optical head includes the casing having the window portion for radiating the linear light to the outside, the light emitting element provided in the casing, the concave mirror located in said casing at a distance from said light emitting element in a scanning direction for each said line, and the toroidal lens located so as to transmit the light from said concave mirror in said casing.

17. A line-scanning optical printer according to claim 16, wherein said window portion of said optical head is provided on a surface parallel to a plane containing said light emitting element and said concave mirror.

18. A line-scanning optical printer according to claim 17, wherein said optical head further includes a flat mirror for vertically reflecting the light emitted from said light emitting element and reflected by said concave mirror so that the reflected light is guided to said window portion.

19. A line-scanning optical printer according to claim 18, wherein said flat mirror is located between said toroidal lens and the optical shutter.

20. A line-scanning optical printer according to claim 19, further comprising an optical path changing lens located between said light emitting element and said concave mirror and capable of refracting the light emitted from said light emitting element so that the light strikes at a specified area in the concave mirror.

21. A line-scanning optical printer according to claim 20, wherein said toroidal lens is formed integrally with said optical path changing lens.

22. A line-scanning optical printer according to claim 18, further comprising a mask member located between said concave mirror and said flat mirror, said mask member having an aperture for transmitting the reflected light converted into a linear light by said concave mirror and shielding scattered light.

23. A line-scanning optical printer according to claim 22, wherein said aperture of said mask member is rectangular, having a narrower central portion and wider end portions.

24. A line-scanning optical printer according to claim 1, wherein an optical element constituting said optical system changes shape when mounted in said casing.

25. A line-scanning optical printer according to claim 24, wherein said optical system is a toroidal lens.

26. A line-scanning optical printer according to claim 25, wherein said toroidal lens changes shape when mounted in said casing such that three portions of said toroidal lens, including both ends and the center, are regulated by means of said casing.

27. A line-scanning optical printer according to claim 1, wherein said casing has a scattered light preventing projection on the interior wall surface thereof for preventing the light emitted from said light emitting element from scattering.

28. A line-scanning optical printer according to claim 1, wherein said sensitized material has the form of a sheet.

29. A line-scanning optical printer according to claim 28, wherein said sensitized material is a film with self-developing solution.

30. A line-scanning optical printer according to claim 29, wherein an image is formed when said casing moves with respect to said film with self-developing solution.

31. A line-scanning optical printer according to claim 30, wherein said casing is provided with a cleaning member adapted to reciprocate in a write region set between a write start position in which optical write in said film is started and a write end position in which the optical write is finished, thereby effecting the optical write in said film, and to clean the surface of said liquid crystal optical shutter, which faces the film, in a region other than said write region.

32. A line-scanning optical printer according to claim 31, wherein said cleaning member is an elastic body fixed to the print scanning holder and adapted to wipe off the surface of said liquid crystal optical shutter, which faces the film, to clean said liquid crystal optical shutter when said casing is moved to a position other than the write region.

33. A line-scanning optical printer according to claim 32, wherein said cleaning member is provided with a de-electrifying piece on a portion of said cleaning member, wherein said delectrifying piece contacts the surface of a protective glass so as to protect the liquid crystal optical shutter, which faces the film.

34. A line-scanning optical printer according to claim 30, wherein said casing and said film with self-developing solution are superposed on each other so that the whole area of said film can be scanned with said window portion as said casing moves.

35. A line-scanning optical printer according to claim 34, wherein said casing and said film are stored, respectively, in a print scanning holder and a sensitized sheet tray holder constructed independently of each other, the print scanning holder being provided with a casing drive mechanism and a drive control circuit board for moving said casing with respect to said film.

36. A line-scanning optical printer according to claim 35, wherein said print scanning holder has a space over said sensitized sheet tray holder said space containing said casing and said casing drive mechanism therein when caused to overlap said sensitized sheet tray holder and a space partially covering said sensitized sheet tray holder side, situated beside said film, and said space containing said drive control circuit board therein.

37. A line-scanning optical printer designed to form an image on a sensitized material by projecting a linear light while successively scanning individual lines said line-scanning optical printer comprising:

a platform having therein a sensitized sheet pack stored with a plurality of sensitized sheets, a sensitized sheet discharge mechanism and a circuit board;

a housing fixedly placed on said platform;

a scanning head located in said housing; and a scanning head drive mechanism for rectilinearly reciprocating the scanning head in the housing, said scanning head including a casing having a window portion formed in part of the underside thereof, a light emitting element which functions as a point light source and is stored in said casing, an optical system for causing light from the light emitting element, as the linear light, to pass through the window portion of said casing, and an optical shutter mounted facing the window of said casing, the optical shutter being capable of operating in response to a driving signal from said circuit board.

38. A line-scanning optical printer according to claim 37, wherein said light emitting element is located in the center of the casing with respect to the moving direction of the casing, and the light emitted from the light emitting element first advances in the moving direction of the casing, is reflected by a concave mirror fixed to one end portion of the casing, then advances in the direction opposite to the moving direction of the casing, is reflected by a reflector fixed near the other end portion of the casing, and then advances toward a sensitized sheet through the window of the casing.

39. A line-scanning optical printer designed to form an image on a sensitized material by projecting a linear light onto the sensitized material while successively scanning individual lines across the sensitized material, said line-scanning optical printer comprising:

a light shielding casing having a window portion for radiating the linear light externally to the casing;

a light emitting element in the casing, wherein the light emitting element functions as a point light source and is positioned in the casing;

an optical system for guiding light originating from the point light source or light emitting element as the linear light to said window portion and positioned within said casing; and a liquid crystal optical shutter positioned in an optical path of said optical system and attached to the window portion.

* * * * *